H. HAISS.
MEANS FOR HEATING STEERING WHEELS.
APPLICATION FILED JULY 5, 1918.
1,296,286.
Patented Mar. 4, 1919.
2 SHEETS—SHEET 1.
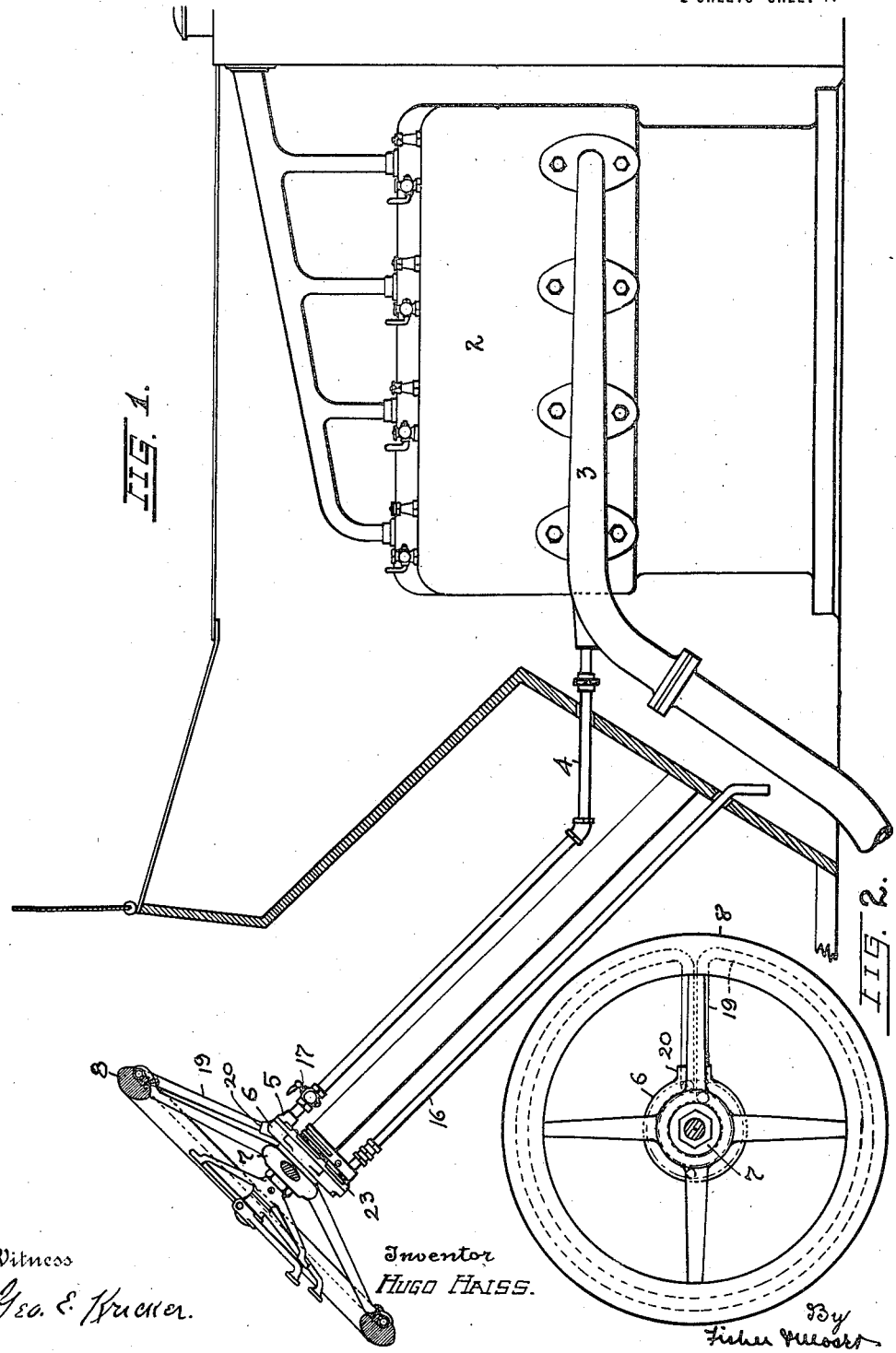
Inventor
HUGO HAISS.
Witness
Geo. E. Kricker.
By
Fisher &co.
Attorneys H. HAISS.
MEANS FOR HEATING STEERING WHEELS.
APPLICATION FILED JULY 5, 1918.
1,296,286.
Patented Mar. 4, 1919.
2 SHEETS—SHEET 2.
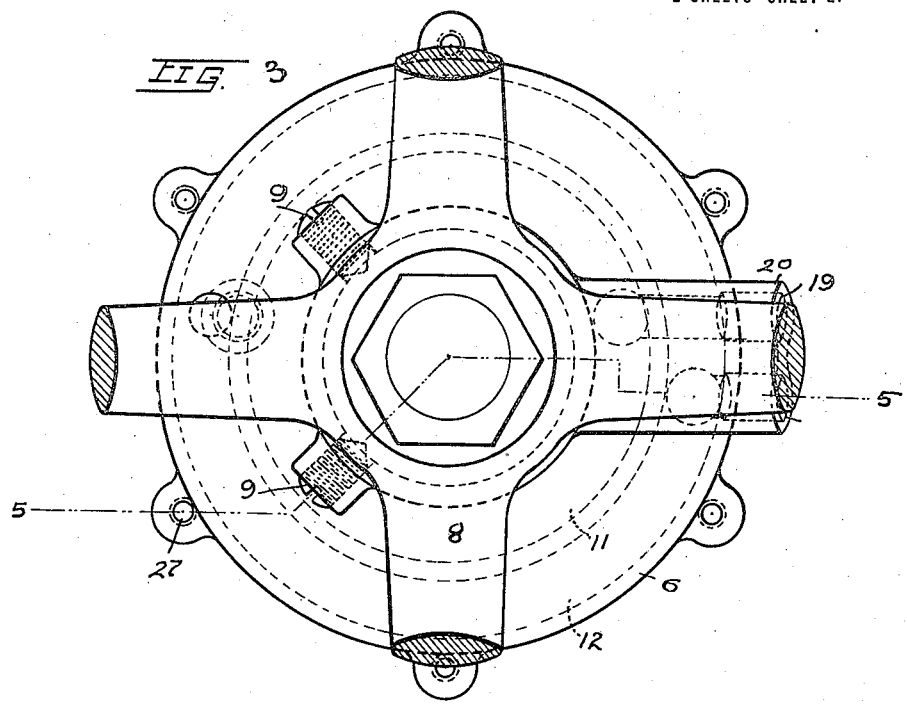
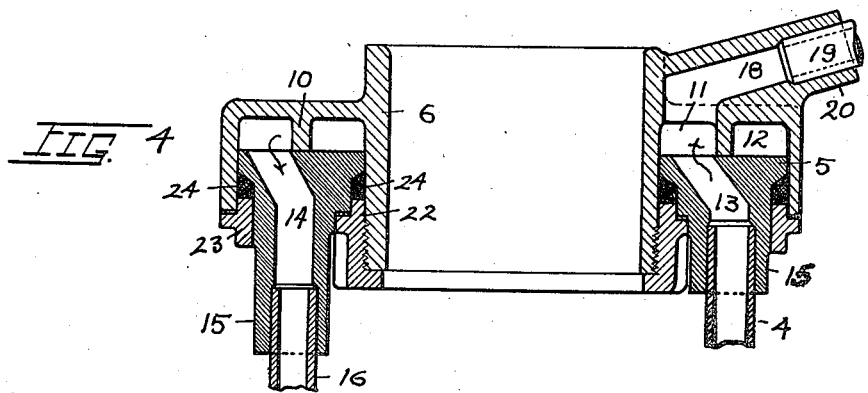
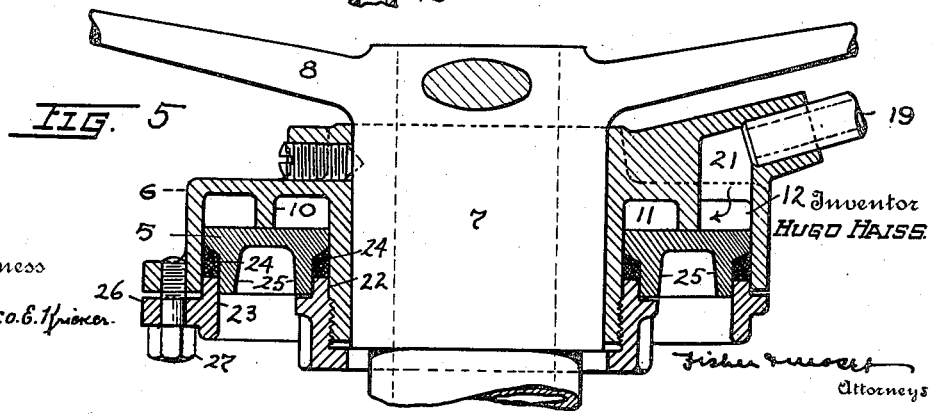

UNITED STATES PATENT OFFICE.

HUGO HAISS, OF ALLIANCE, OHIO.

MEANS FOR HEATING STEERING-WHEELS.

1,296,286.

Specification of Letters Patent.   Patented Mar. 4, 1919.

Application filed July 5, 1918.   Serial No. 243,312.

*To all whom it may concern:*

Be it known that I, HUGO HAISS, subject of Germany, residing at Alliance, in the county of Stark and State of Ohio, have invented certain new and useful Improvements in Means for Heating Steering-Wheels, of which the following is a specification.

This invention relates to a heating attachment for steering wheels, and the invention is an improvement on the device shown and described in my application for Letters Patent filed Dec. 20, 1917, Ser. No. 208,072.

I have found that a wheel heating device which is dependent upon the use of exhaust engine gases is decidedly objectionable and quite impracticable unless the escape of the gas is absolutely prevented at the wheel. Therefore, I have devised the present device to overcome leakage of the heating gases at the rotatable joints of the attachment, and have arranged the parts so that adjustment and take-up may be easily and quickly accomplished when wear or leakage does occur.

In the accompanying drawing, Figure 1 is a side view of an automobile engine and steering wheel equipped with my improved heating attachment. Fig. 2 is a plan view of the wheel with its heating tube shown underneath in dotted lines. Fig. 3 is an enlarged plan view of a portion of the steering wheel with the distributing head arranged beneath the same as in use. Fig. 4 is a sectional view through the distributing head, showing the circulating pipe connections. Fig. 5 is a view in section of Fig. 4, showing the distributing head affixed to the steering wheel hub.

The invention involves the use of an internal combustion engine 2 having an exhaust manifold 3 which may be tapped and connected by a small pipe 4 to a non-rotatable ring 5 surrounding gas distributing collar 6 which is constructed to be detachably secured to the hub 7 of a steering wheel 8 of an automobile or other vehicle in which the engine is installed. The wheel is supported as usual on a stationary post, and collar 6 is adapted to sleeve snugly and tightly upon hub 7, and set screws 9 fix the collar in place thereon to rotate therewith. The collar has a relatively wide annular channel about the outside thereof, which is subdivided at its top by an endless rib 10 into two smaller annular channels 11 and 12, respectively. Ring 5 fits within the large channel and bears against rib 10 to provide separate receiving and discharging spaces for the hot gases, and ring 5 has a vertical port or passage 13 open to the inner receiving channel 11 and also a second port or passage 14 open to the discharge channel 12. These two ports are placed diametrically opposite each other and tubular bosses 15 extend downwardly from the ring and afford means for making a gas-tight connection with the intake pipe 4 and an exhaust pipe 16. A valve 17 is also placed in pipe 4 within convenient reach of the operator of the wheel, whereby the flow of hot gases may be controlled.

The direction taken by the gases after entering the inner channel 11 is upwardly through a passage 18 into one straight end of a small pipe 19 which extends from a lateral projection 20 on collar 6 to the wooden rim 8 of the wheel, and thence makes a circuit through the circular portion of pipe 19 within the bottom surface of the wheel rim to the place of beginning and outwardly through the other straight end of the pipe 19 into a duct or passage 21 which opens into the outer annular channel 12 in the collar.

In order to make the joints between the ring and collar absolutely leak proof and to permit independent adjustment and a tight fit at each joint line at the inner and outer circumference of ring 5, I have provided two separate packing glands 22 and 23, respectively, to compress and hold suitable hemp or other packing material 24 in the annular spaces between the flanged portion 25 of the ring and the outer and inner walls of the collar. The smaller gland member 22 has screw-threaded engagement with the inner circular wall of the collar, whereas the larger ring gland 23 is provided with lateral ears 26 through which bolts 27 extend into corresponding ears on the collar, and the packing can be compressed or renewed at will by and through these separate glands and their respective adjusting and fastening means.

What I claim is:

1. A heating attachment for steering wheels, comprising a collar having fluid circulating channels, a ring within said collar closing said channels, packing between said ring and collar, and adjustable means for holding and compressing said packing.

2. In means for heating a steering wheel, a channeled collar adapted to be secured to a steering wheel, a ring having intake and exhaust pipe connections and operably engaged with said collar to close the channels therein, packing at the ring joints, and adjustable gland members affixed to said collar and holding the packing and ring together in the collar.

3. In means for heating a steering wheel, a collar having a pair of concentric channels and provided with a circulating pipe open at its ends to said channels, a ring having intake and exhaust pipe connections open to said channels and fitting within said collar, packing at the inner and outer sides of said ring, and separate gland members adjustably affixed to said collar to compress and hold said packing.

4. A heating attachment for a steering wheel, comprising a collar having an enlarged annular channel in its bottom and a double channel in its upper portion, a ring snugly fitting within said enlarged channel and closing said double channels, said collar and ring having separate intake and outlet ports respectively, and packing and means to compress the packing at the joints between said ring and collar.

5. In means for heating the steering wheel of a vehicle, a steering wheel having a hub, a collar surrounding said hub and rigid therewith, a heat distributing medium affixed at its ends to said collar and in heating relations with the steering wheel, separate annular channels about said collar open to the respective ends of said heat distributing medium, a separate ring within said collar forming a closure for said channels and having separate intake and exhaust connections open to said channels, packing at each side of said ring and separate means at each side of said ring to hold and compress each packing separately.

Signed at Alliance, Ohio, in the county of Stark, and State of Ohio, this 29 day of June, 1918.

HUGO HAISS.